United States Patent
Cho et al.

(10) Patent No.: US 6,663,961 B2
(45) Date of Patent: Dec. 16, 2003

(54) PROCESS FOR PREPARATION OF POLYESTER-BASED POLYMERS

(75) Inventors: Hyun Nam Cho, Seoul (KR); Sang Ho Bae, Seoul (KR); Il Seok Choi, Koyang (KR)

(73) Assignees: Oil Corporation, Seoul (KR); Korea Institute of Science and Technology, Seoul (KR)

( * ) Notice: Subject to any disclaimer, the term of this patent is extended or adjusted under 35 U.S.C. 154(b) by 193 days.

(21) Appl. No.: 09/883,975

(22) Filed: Jun. 19, 2001

(65) Prior Publication Data

US 2002/0086970 A1 Jul. 4, 2002

(30) Foreign Application Priority Data

Dec. 30, 2000 (KR) .......................... 2000-87321

(51) Int. Cl.$^7$ .......................... B32B 15/02; C08G 63/78
(52) U.S. Cl. .................. 428/402; 528/275; 528/279; 528/280; 528/281; 528/283; 528/285; 528/286; 528/298; 528/302; 528/308; 524/706; 524/711; 524/765; 524/767
(58) Field of Search ................... 528/275, 279, 528/280, 281, 283, 285, 286, 298, 302, 308; 524/706, 711, 765, 767; 428/402

(56) References Cited

U.S. PATENT DOCUMENTS

| 5,286,836 | A | * | 2/1994 | Park et al. ................. 528/275 |
| 5,714,570 | A | * | 2/1998 | Kim et al. ................. 528/279 |
| 6,040,417 | A | * | 3/2000 | Cho et al. ................. 528/279 |
| 6,133,404 | A | * | 10/2000 | Kang et al. ................. 528/279 |
| 6,323,305 | B1 | * | 11/2001 | Cho et al. ................. 528/298 |

* cited by examiner

Primary Examiner—Samuel A. Acquah
(74) Attorney, Agent, or Firm—Darby & Darby

(57) ABSTRACT

This invention is related to a process for preparing polyester polymers using a composite catalyst comprises the steps of 1) esterifying naphthalene dicarboxylic acid or a dicarboxylic acids containing NDCA or ester derivatives thereof, with ethylene glycol or glycols containing ethylene glycol or derivatives thereof to produce esterified compounds or its low molecular weight polymers; and then 2) continuously polycondensing the obtained esterification product to produce polyester polymers; and wherein the process includes using a composite polymerization catalyst which was prepared by reacting titanium compounds and cobalt compounds in the solution containing at least one alcohol. The process yields high quality polyester polymers having a good color and excellent physical properties. The process can considerably reduce both the esterification time and the polycondensation time.

14 Claims, No Drawings

PROCESS FOR PREPARATION OF POLYESTER-BASED POLYMERS

BACKGROUND OF THE INVENTION

1. Field of the Invention

The present invention relates to a novel process for preparing polyester-based polymers. More particularly, the present invention relates to a novel and advanced process for preparing polyester-based polymers by using a composite polymerization catalyst which was prepared by reacting titanium compounds and cobalt compounds in the solution containing at least one alcohol.

2. Description of the Background Art

Polyester-based polymers, for example, polyethylene terephthalate (PET), polybutylene terephthalate (PBT) and/or polyethylene naphthalate (PEN), which are currently industrially manufactured, have high degrees of crystallinity, higher softening points and numerous other superior properties in terms of mechanical strength, resistance to gas permeability, chemical resistance, thermal resistance, weather resistance and electrical insulation, etc. Thus, they are widely used for manufacturing high quality films, bottles, high strength fibers and other industrial materials.

There are two steps in industrial preparations of polyesters such as PET and/or PEN. The first step is to make esterified low molecular weight compounds by reacting diacid or derivatives of diacid with glycols. The product of this step in making PEN is bis(beta-hydroxyethyl) naphthalate or their low molecular weight prepolymers (hereinafter referred to as "esterified compounds"). The product of this step in making PET is bis(beta-hydroxyethyl) terephthalate or their low prepolymers.

The first step is performed by means of either a direct esterification or an ester-interchange reaction which is called as transesterfication also. In the ester-interchange reaction, dimethyl terephthalate (DMT) or 2,6-naphthalene dicarboxylic acid dimethylester (2,6-NDC) is reacted with ethylene glycol (EG) in the presence of a catalyst such as zinc acetate [$Zn(OAc)_2$] or manganese acetate [$Mn(OAc)_2$] at reaction temperatures ranging from 180 to 260° C. and the side product, that is methanol, is removed. In case of direct esterification reaction, TPA (terephthalic acid) or 2,6-naphthalene dicarboxylic acid (2,6-NCDA) is mixed with ethylene glycol (EG) and reacted at the temperatures ranging from 200~280° C. under atmospheric pressure or under slight pressure and the side product, that is water, is removed. Thereafter in the second step, the synthesized, esterified compounds are polycondensed in the presence of a polymerization catalyst such as antimony trioxide ($Sb_2O_3$) at higher reaction temperatures ranging from 280 to 300° C. under reduced pressure (generally less than 1.0 torr) in order to prepare the high molecular weight polymers.

Currently, in the case of PET, the direct esterification method is mostly used, which uses the TPA as a starting material. But in the case of preparing PEN, because of the high cost, the ester-interchange reaction method is mostly adopted. Meanwhile, PBT can also be prepared by a similar method except that 1,4-butanediol is used instead of EG.

Generally, a reaction catalyst is employed to accelerate and smoothly advance a reaction in preparing polyester. These catalysts include a variety of metal compounds of antimony, titanium, germanium, tin, zinc, manganese, lead and the like.

However, it is well known that the color and the thermal stability of the resulting polyester, especially, PEN, and the reaction rate considerably depend on the catalysts employed. The reactions for preparing polyester are carried out at high temperatures for an extensive period in the presence of catalysts containing metals. Thus, several undesirable side reactions that result in coloring the polymer product yellow and increasing the amount of diethylene glycol and the concentration of terminal carboxylic groups above their optimum levels are accompanied in preparing high molecular weight polyesters. Yellowish color and excessive amount of diethylene glycol deteriorate the physical properties of the polyester such as the melting point, strength and the like. Therefore, it is important to prepare polyester that can exhibit good color and superior physical properties at a higher reaction rate.

Currently, antimony compounds, especially, antimony trioxide, are mostly used as industrial polycondensation catalysts due to its acceptable catalytic activity and moderate price.

But since antimony trioxide is not solved well in ethylene glycol and in reaction intermediate for preparing polyester, it tends to precipitate during the reaction and it cause the resulting color of the polyester to become gray or yellow-green and less transparent. These effects are more distinct when the amount of the catalyst added is increased or the reaction temperature is raised to improve the production rate.

In order to overcome the above-mentioned problems, there have been several methods using catalysts to produce polyester exhibiting good color and superior physical properties by reducing the esterification reaction time and the polycondensation reaction time. However, many of the proposed methods could not overcome the above-mentioned problems: a method of using catalyst as a solution prepared by dissolving antimony trioxide with cobalt compound and phosphorous compound together in ethylene glycol (Japanese Laid Open Patent Publication No. 53-51295) and a method in which a compound of antimony is used with an organic acid (Japanese Laid Open Patent Publication No. 60-166320) were attempted. However, these methods fail to reduce both the esterification reaction time and the polycondensation reaction time. And they also caused several problems in the physical properties of the prepared polyesters in that the color of the prepared polymer is light yellow and the content of diethylene glycol or terminal carboxylic groups is not reduced sufficiently.

Also, as a method to improve the color and physical properties of the prepared polymer, there have been known a method in which compounds of cobalt and alkali metal are used with a compound of antimony (Japanese Laid Open Patent Publication No. 58-117216), a method in which a compound of antimony is used with a compound of tin (Japanese Laid Open Patent Publication No. 49-31317), and a method in which antimony compound, tin compound and compounds of cobalt and alkalimetal, phosphorous compounds are used together (Japanese Laid Open Patent Publication No. 62-265324). However, these methods are incapable of improving the color and transparency, physical properties of the prepared polymer significantly. And these methods fail to provide any important advantage in reducing the reaction time.

Meanwhile, by previous inventions made by the present inventors, problems of preparing polyesters, especially PET, have been overcome by using titanium compound and antimony compound together (U.S. Pat. No. 5,286,836) or by using a composite catalyst containing additional tin compound along with titanium compound and antimony compound (U.S. Pat. No. 5,714,570)

However, a marked difference between the preparation of PEN and PET exists. For instance, the reactant, 2,6-NCDA has a lower solubility in EG because of higher molecular weight and smaller crystal size of 2,6-NDCA than TPA. Therefore, it is not possible to feed the slurry prepared by mixing 2,6-NCDA and EG in similar molar ratio as in PET preparation (generally, EG/TPA=1.1~2.5) into the reactor.

Since the naphthalene ring structure of 2,6-NDCA or 2,6-NDC is more liable to become colorized by impurities than the benzene ring structure of PET, careful selection of catalyst is very critical to attain good colored product. And because PEN has a higher melt viscosity, it requires a higher polymerization temperature than PET. However, higher temperature makes PEN be colored and more liable to degradation. To overcome this problems, efficient catalyst is essential to reduce the reaction time in preparing the polymer Although several methods to overcome these problems have been proposed, those were not so successful in shortening the reaction time or in improving the product quality.

SUMMARY OF THE INVENTION

Therefore, an object of the present invention is to provide a process for preparing polyester-based polymers while reducing both the esterification time and the polycondensation time and providing good color and excellent physical characteristics to prepare a high quality polyester with high productivity, by reacting a cobalt compound and a titanium compound in the presence of at least one alcohol solvent and using the resultant compound as a catalyst.

DETAILED DESCRIPTION OF THE PREFERRED EMBODIMENTS

The present invention provides a process for preparing polyester polymers comprising the steps of:

(a) esterifying naphthalene dicarboxylic acid (NDCA) or a dicarboxylic acids containing NDCA or ester derivatives thereof, and ethylene glycol or glycols containing ethylene glycol or derivatives thereof to produce esterified compounds or its low molecular weight polymers; and (b) continuously polycondensing the resultant esterified compounds of step (a) to produce polyester polymers;

wherein in the above preparation process a composite polymerization catalyst is used, which composite polymerization catalyst is prepared by reacting cobalt compounds and titanium compounds in the presence of a solution comprising at least one alcohol compound. The titanate compounds are represented by formula I and selected from the group consisting of a titanate compound, a phosphite complex compound thereof and a mixture thereof:

(RO)$_4$Ti  Formula I wherein each R is independently the same or different and is selected from the group consisting of methyl, ethyl, n-propyl, isopropyl, n-butyl, isobutyl, sec-butyl, tert-butyl, n-amyl, acetylisopropyl, pentyl, hexyl, heptyl, 2-ethylhexyl, octyl, decyl, dodecyl, tridecyl, octadecyl, stearyl, allyl, 2,2-diallyloxymethylbutyl, cyclopentyl, cyclohexyl, naphthyl, phenyl, benzyl, and dodecylbenzyl.

In the present invention, the titanium compound may be a titanium phosphite complex compound represented by the below formula II:

(RO)$_4$Ti.2XP(O)(OR')$_2$  Formula II wherein each of R and R' is independently the same or different and is selected from the group consisting of methyl, ethyl, n-propyl, isopropyl, n-butyl, isobutyl, sec-butyl, tert-butyl, n-amyl, acetylisopropyl, pentyl, hexyl, heptyl, 2-ethylhexyl, octyl, decyl, dodecyl, tridecyl, octadecyl, stearyl, allyl, 2,2-diallyloxymethylbutyl, cyclopentyl, cyclohexyl, naphthyl, phenyl, benzyl, and dodecylbenzyl and X is selected from the group consisting of hydrogen, halogen, alkyl, alkoxy or aryloxy.

In formula II, R' is preferred to be an aromatic group, and more preferably, it forms a complex with an aromatic phosphite such as diphenylphosphite, triphenylphosphite or phenylnaphthylphosphite.

The titanium compound used in the composite catalyst of the present invention can be selected preferably from the group consisting of tetraisopropyl titanate, tetrabutyl titanate, tetraisopropyldi(dioctyl)phosphito titanate and tetraoctyl(ditridecyl)phosphito titanate. Example of other titanium compounds that can be used in the present invention are titanium ethylene glycoxide, titanium halides such as titanium tetrachloride, titanium esters such as potassium titanium oxyoxalate, monoalkoxy titanates selected from the group consisting of isopropyl triisostearoyl titanate and isopropyl tri(N-ethylenediamino)ethyl titanate, titanate chelate compounds selected from the group consisting of dicumylphenyl oxoethylene titanate and di(dioctyl) phosphato ethylene titanate, neoalkoxytitanate compounds selected from the group consisting of neopentyl(diallyl) oxytri(N-ethylenediamino) ethyltitanate and neopentyl (dially)oxytridodecylbenzene sulfonyltitanate, and heterocyclic titanates selected from the group consisting of cyclo (dioctyl) pyro-phosphatodioctyl titanate and dicyclo (dioctyl) pyrophosphatotitanate.

The cobalt compound used in the composite catalyst of the present invention can be selected from the group consisting of cobalt acetate, cobalt acetylacetonate, cobalt bromide, cobalt carbonate, cobalt chloride, cobalt 2-ethylhexanoate, cobalt fluoride, cobalt hydroxide, cobalt nitrate, cobalt oxalate, cobalt perchlorate, cobalt sulfate, cobalt tetrafluoroborate and cobalt thiocyanate.

Almost all primary alcohols can be used in the preparation of composite catalyst of the present invention. That is, one or the mixture of the alcohols selected from the group consisting of a primary alcohol, a secondary alcohol, a polyhydric alcohol and mixtures thereof can be used. For example, a primary alcohol can be selected from aliphatic, cyclic or aromatic alcohols having 1 to 20 carbons. More particularly, primary alcohols can be selected from methanol, ethanol, n-propyl alcohol, isopropyl alcohol, n-butyl alcohol, isobutyl alcohol, sec-butyl alcohol, tert-butyl alcohol, n-amyl alcohol, acetylisopropyl alcohol, pentyl alcohol, hexyl alcohol, heptyl alcohol, 2-ethylhexyl alcohol, octyl alcohol, decyl alcohol, dodecyl alcohol, tridecyl alcohol, octadecyl alcohol, stearyl alcohol, allyl alcohol, 2,2-diallyloxymethylbutyl alcohol, cyclopentyl alcohol, cyclohexyl alcohol, phenyl alcohol, benzyl alcohol and dodecylbenzyl alcohol. Among those alcohols, it is more preferable to use an alcohol selected from methanol, ethanol, propanol, isopropyl alcohol, butanol, isobutyl alcohol, pentanol, hexanol, 2-ethylhexyl alcohol, octanol and isooctanol.

The secondary alcohol can be an aliphatic, cyclic or aromatic alcohol selected from ethylene glycol, diethylene glycol, triethylene glycol, polyethylene glycol, 1.3-propanediol, 1,2-propanediol, 1,2-butanediol, 1,3-butanediol, 1,4-butanediol, 1,5-pentanediol, 1,6-haxanediol, 1,4-cyclohexane dimethanol, 2,6-decahydronaphthalene dimethanol, 1,4-cyclohexanediol, bisphenol A, bisphenol S, bishydroxyethoxy bisphenol A, and tetrabromobisphenol A. Especially, ethylene glycol, diethylene glycol, triethylene glycol, polyethylene glycol, 1.3-propanediol and 1,4-butanediol are preferred among them. Also, a polyhydric alcohol such as trimethylolpropane, glycelin, pentaerythritol can be used.

Any alcohol or the mixture of alcohols which does not slow the reaction rate or degrade the physical quality of the polymer can be used. But it is preferable to use an alcohol that is less expensive and more effective in reacting cobalt compounds and titanium compounds.

When the composite catalyst is prepared in alcohol solution, the reaction conditions are not necessarily restricted. But composite catalyst solution reacted at a temperature of 30° C.~300° C., preferably at 50° C.~200° C., under atmospheric pressure is more desirable due to its higher activity in make polyester polymer. Required reaction time is 0.1–10 hrs, 0.5–6 hrs preferably.

The amount of alcohol used in the preparation of composite catalyst need not be restricted. However, it is preferred to use the amount of alcohol to make the concentration of titanium compounds and cobalt compounds to be about 0.1 to 50 wt %, more preferably about 0.1 to 10 wt %. According to the kinds of alcohol and according to circumstances, the catalyst is separated as a solid or powder. The separated powder also can be used as a reactive catalyst with its excellent catalytic effect.

If nothing interferes with the reaction, alcohol can be used in a mixed solution with a different solvent, and especially, water may be added to alcohol. In case of adding water, preferred amount of water to be added is 0.01 to 10.0 times of the alcohol used. And most preferably, 0.1 to 1.0 times of the alcohol is added.

Meanwhile, the above processed catalyst composition may be combined together with antimony compounds and/or tin compounds.

Antimony compounds usable in the present invention can be selected from the group consisting of antimony oxides such as antimony trioxide, antimony tetroxide or antimony pentoxide, antimony halides such as antimony trichloride or antimony trifluoride, antimony carboxylates such as antimony triacetate [Sb(OAc)$_3$), antimony tristearate, antimony tribenzoate, antimony tri-2-ethylhexanoate, or antimony trioctoate, antimony compounds combined with ether such as antimony triethoxide, antimony ethylene glycoxide, antimony tri-isopropoxide, antimony tri-n-butoxide, or antimony triphenoxide, antimony hydroxide, and antimony sulfide. Among these antimony compounds, antimony trioxide and antimony triacetate are preferred.

Alternatively, a tin compound represented by formula III can be used in the preparation of the present composite catalyst:

    Formula III

Wherein $R_2$ is identical to the R of the above-mentioned titanium compounds of formula I and II, and X' represents oxygen, sulfur, halogen or the compounds containing ether, thio or ester bonds. More specifically, tin compounds usable in the present invention include dibutyltin oxide, diphenyltin sulfide, dimethyltin chloride, dibutyltin sulfate, dioctyltin mercaptide, dibutyltin bis(dibutyldithiocarbamate), dibutyltin laurate, dibutyltin disalicylate, dibutyltin maleate, dibutyltin methoxide, dibutyltin laurate maleate, dibutyltin stearate, dioctyltin bis(isooctylmercaptoacetate), dioctyltin maleate and dibutyltin mercaptoacetate.

It is not necessary to limit the amount of the catalyst used in the present invention. However, it is desirable to have enough quantity to obtain desirable reaction rates depending on the reaction condition. The desirable quantity of the composite catalyst is 20 to 2000 ppm, more preferably 50 to 500 ppm of the resulting PEN polymer.

Also, the catalyst can be added to the reaction mixture during the esterification reaction period or some time between esterification reaction and polycondensation reaction.

However, it is desirable to add the composite catalyst before or at the beginning of the esterification reaction to shorten the both esterification reaction time and polycondensation time. Especially when the esterification reaction is performed by using the premixed slurry of 2,6-NDCA or TPA with ethylene glycol, it is preferable to add the present novel composite catalyst to the reactant slurry before esterification reaction. Alternatively, the composite catalyst can be added in two times. In that case about 50 wt % of required composite catalyst is added before esterification reaction and the rest is added before the initiation of polycondensation reaction.

When performing the direct esterification reaction according to the present invention, it is desirable to perform the reaction at 200~280° C. at any pressure condition such as atmospheric or high pressure condition. In the case of the ester interchange reaction, it is desirable to use the composite catalyst of the present invention instead of the conventional catalyst at 180~260° C.

The esterified compounds obtained by the esterification reaction can be polycondensed at 280~300° C., preferably having a final temperature of 285~295° C. It is desirable to have lower than 1 torr of vacuum as a final pressure, and it is desirable to elevate the reaction temperature and to slowly increase the degree of vacuum simultaneously during the polycondensation reaction.

Also it is possible to use other reaction catalysts together with the composite catalyst of the present invention. Germanium compounds such as germanium oxide, carboxylate compounds of zinc or manganese or lead such as zinc acetate, manganese acetate and lead acetate, and alkali metal compounds such as sodium hydroxide, potassium hydroxide, and sodium acetate, potassium acetate can be used.

The present invention can be effectively applied in producing polyester polymers and/or copolymers by esterifying dicarboxylic acid or derivatives selected from the group of naphthalene dicarboxylic acid (NDCA), dicarboxylic acid containing NDCA or derivatives thereof, especially, 2,6-NDCA, TPA, 2,6-NDC, DMT and their mixtures with glycol and derivative thereof selected from the group of ethylene glycol, 1,3-propanediol, 1,4-butanediol and their mixtures.

In addition, the present invention can also be effectively applied in producing other aliphatic or aromatic polyester and their copolymers by using other dicarboxylic acids or their esters and various glycols beside ethylene glycol.

Usable dicarboxylic acid are one or the mixture of selected from the group of aromatic or aliphatic, cyclic dicarboxylic acid and derivatives thereof such as phthalic acid or isophthalic acid, diphenylsulfondicarboxylic acid, diphenylmethanedicarboxylic acid, diphenyletherdicarboxylic acid, diphenoxyethanedicarboxylic acid, malonic acid, succinic acid, glutaric acid, adipic acid, azelaic acid, sebacic acid, cyclohexanedicarboxylic acid and decalindicarboxylic acid, or the derivatives thereof such as methyl ester, ethyl ester and phenyl ester compounds.

The usable glycols include aliphatic, cyclic and aromatic diols such as 1,3-propanediol, 1,2-propanediol, 1,2- butanediol, 1,3-butanediol, 1,4-butanediol, 1,5-pentanediol, 1,6-haxanediol, 1,4-cyclohexane dimethanol, 2,6-decahydronaphthalene dimethanol, 1,4-cyclohexanediol, bisphenol A, bisphenol S, bishydroxyethoxy bisphenol A, and tetrabromobisphenol A.

Also, a polyfunctional cross-linking agent selected from the group consisting of trimellitic acid, trimesic acid, pyromellitic acid, trimethylolpropane, glycerin, and pentaerythritol, and/or a terminating agent selected from the group consisting of monomethoxypolyethylene glycol, stearyl alcohol, palmitic acid, benzoic acid, and naphthoic acid can be added.

Moreover, a phosphorous compound can be added as a thermal stabilizer. The phosphorous compounds that can be used as a thermal stabilizer are phosphoric acid, phosphorous acid, metaphosphoric acid, trimethylphosphate, triethylphosphate, triphenylphosphate, trioctylphosphate, dimethylphosphite, diethylphosphite, dicyclohexylphosphite, diphenylphosphite, dioctylphosphite, dimethylpyrophosphate, diethylpyrophosphate, diphenylpyrophosphate, dicyclohexylpyrophosphate, dioctylpyrophosphate. A hindered phenol such as Irganox 1010, Irganox 1076, and Irganox 1098, products of Ciba-Geigy Company, Germany, can be added as an antioxidant. In case of employing titanate compounds in the phosphite complex form having the formula II, it is not necessary to add such stabilizer.

In addition, other additives can be used: an ultraviolet absorbent such as benzotriazol, an anti-softening point dropping agent such as triethylamine, a delustering agent such as titanium oxide, a nucleating agent such as silica and alumina, and other compounds such as a dye, a fluorescent whitening agent, an antistatic agent and a flame retardant.

The present invention will now be described with the following examples. It should be understood that these examples are intended to be illustrative manner only and the present invention is not limited to the conditions, materials or devices recited therein.

In the following examples, all parts are given by weight unless otherwise stated. Esterification Ratio (ER) was obtained by measuring the acidity value (AV) and saponification number (SN) of the produced esterified compound after the esterification reaction. The intrinsic viscosity ($\eta$) of the polymers was evaluated by measuring the dilute polymer solution prepared by dissolving the polymer in an admixed co-solvent of phenol and tetrachloroethane. The color of the polymers was measured in the chip state of the polymers by color diffractometer, and the L values and b values describe the lightness and the degree of yellowness of the polyesters, respectively. A higher L value and a lower b value indicate improved color.

EXAMPLE 1

A composite catalyst was prepared by heating and reacting 100 wt ppm of tetraisopropyl titanate and 50 wt ppm of cobalt acetate for the finally obtained polymer mass in methanol at the temperature of 50° C. for 24 hours was fed into a slurry comprising 102 parts of EG, 238 parts of 2,6-NDCA and 100 parts of methanol. When the reaction medium temperature of the esterification reactor containing 300 parts of previously prepared esterified polymers reached the preset 240° C., all of the slurry were injected, and the esterification was continued to the end point which was determined by monitoring in distillation column temperature changes and in the reaction by-product, that is water, formation rate. After continuation of esterifying reaction for 4 hours and 10 minutes, esterified compound having an esterification ratio of 96% was obtained. Thereafter, the resulting esterified compound was transferred to a polycondensation reactor equipped with a stirrer for mixing and a torque meter to monitor viscosity increase. After 100 ppm of trimethylphosphate based on the esterified compounds were added to the reactor, the temperature was slowly raised and the pressure was reduced simultaneously to 295° C. and 0.3 torr, respectively. The polycondensation reaction was continued at that condition with the monitoring of the viscosity increase. After 1 hour and 20 minutes of the polycondensation reaction, the product was extruded from the lower nozzle of the reactor into cooling water. The measured intrinsic viscosity of the final product was 0.645. The L value and the b value of the final product were measured to be 70.64 and 4.3, respectively.

Comparative Example 1

An esterification was carried out in a manner similar to that of Example 1, except that the reaction catalysts were not added into the EG/2,6-NDCA mixture and previously esterified compounds. The esterification continued for 4 hours and 40 minutes, and esterified compound having an esterification ratio of 96% was obtained. Then, the esterified compounds were polycondensed in the same condition as described in Example 1 except that 300 ppm of antimony trioxide and 100 ppm of trimethylphosphate to the amount of the resulting PEN products was added. After polycondensation reaction for one hour and 50 minutes, the product was extruded from the lower nozzle of the reactor into cooling water. The measured intrinsic viscosity of the final product was 0.642. The L value and the b value of the final product were measured to be 68.5 and 4.5, respectively.

EXAMPLE 2

An esterification and polycondensation were carried out under the same conditions as Example 1 except that a solution obtained by heating and reacting 100 ppm of tetraisopropyl titanate and 90 ppm of cobalt acetate in EG at a temperature of 190° C. for 3 hours was used as a composite catalyst. In order for the final product to obtain the same esterification ratio and intrinsic viscosity, 3 hours and 50 minutes and 1 hour and 30 minutes were taken in esterification and polycondensation respectively. The L value and the b value of the final product were measured to be 68.3 and 4.1, respectively.

EXAMPLE 3

An esterification was carried out under the same conditions as Example 1 except that a solution obtained by heating and reacting 150 ppm of tetraisopropyl di(dioctyl)phosphito titanate and 60 ppm of cobalt acetate in isopropanol at a temperature of 60° C. for 24 hours was used as a catalyst and polycondensation was carried out without using trimethylphosphate. In order for the final product to obtain the same esterification ratio and intrinsic viscosity, 4 hour and 5 minutes and 1 hour and 20 minutes were taken in esterification and polycondensation respectively. The L value and the b value of the final product were measured to be 69.1 and 4.3, respectively.

EXAMPLE 4

An esterification and polycondensation were carried out under the same conditions as Example 1 except that a solution obtained by heating and reacting 100 ppm of tetrabutyl titanate and 50 ppm of cobalt acetate was used as a composite catalyst. In order for the final product to obtain the same esterification ratio and intrinsic viscosity, 3 hours and 45 minutes and 1 hour and 35 minutes were taken in esterification and polycondensation respectively. The L value and the b value of the final product were measured to be 68.5 and 4.4, respectively.

EXAMPLE 5

An esterification and polycondensation were carried out under the same conditions as Example 1 except that a solution obtained by heating and reacting 100 ppm of tetraisopropyl titanate and 70 ppm of cobalt oxalate was used as a composite catalyst.

In order for the final product to obtain the same esterification ratio and intrinsic viscosity, 3 hours and 45 minutes and 1 hour and 40 minutes were taken in esterification and polycondensation respectively. The L value and the b value of the final product were measured to be 69.3 and 4.2, respectively.

EXAMPLE 6

An esterification and polycondensation were carried out under the same conditions as Example 1 except that a solution obtained by heating and reacting 100 ppm of tetraisopropyl titanate and 90 ppm of cobalt acetate in a mixture solution containing methanol and EG at 1:1 at a temperature of 60° C. for 3 hours were used as a novel catalyst. In order for the final product to obtain the same esterification ratio and intrinsic viscosity, 3 hour and 50 minutes and 1 hour and 30 minutes were taken in esterification and polycondensation respectively. The L value and the b value of the final product were measured to be 68.3 and 4.1, respectively.

EXAMPLE 7

An esterification and polycondensation were carried out under the same conditions as Example 1 except that a solution obtained by heating and reacting 100 ppm of tetrabutyltitanate and 50 ppm of cobalt acetate in a mixture solution containing methanol and water at 1:1 at a temperature of 60° C. for 3 hours was used as a catalyst. In order for the final product to obtain the same esterification ratio and intrinsic viscosity, 3 hour and 50 minutes and 1 hour and 30 minutes were taken in esterification and polycondensation respectively. The L value and the b value of the final product were measured to be 68.3 and 4.1, respectively.

EXAMPLE 8

A catalyst solution was prepared by reacting 100 ppm of tetrabutyltitanate and 50 ppm of cobalt acetate based on the amount of the resulting PEN products in methanol at a temperature of 40° C. for 24 hours. The catalyst solution was fed into a mixture comprising 260 parts of EG, 490 parts of 2,6-NDC. Then, the resultant product was subject to a transesterification at the temperature of 210° C. The ending point of the transesterification reaction was determined by monitoring the temperature change in the upper distillation column and the reaction by-product, that is methanol, formation rate. After 3 hours and 10 minutes, esterified compound having an esterificaiton ratio of 96% was obtained. Then, the produced esterified compound was transferred to a polycondensation reactor equipped with a stirrer for mixing and a torque meter to monitor viscosity increase. After 100 ppm of trimethylphosphate based on the amount of esterified compound were added to the reactor, the temperature was slowly raised and the pressure was reduced simultaneously to 295° C. and 0.3 torr, respectively. The polycondensation reaction was continued with the monitoring of the viscosity. After 1 hour and 30 minutes of the polycondensation reaction, the product was extruded from the lower nozzle of the reactor into cooling water. The measured intrinsic viscosity of the final product was 0.647. The L value and the b value of the final product were measured to be 69.6 and 4.9, respectively.

EXAMPLE 9

A catalyst solution was prepared by reacting 150 ppm of tetraisopropyl di(dioctyl) phosphitotitanate and 80 ppm of cobalt acetate to the amount of the resulting PET products in methanol at a temperature of 40° C. for 24 hours. It was added into a slurry of EG and TPA as a reaction catalyst. At this time, the total amount of the EG and the TPA were 152 parts and 370 parts, respectively, so that the molar ratio of EG:TPA was controlled to be 1:1. Then, the EG/TPA mixture was fed into an esterification reactor in which 400 parts of the previously esterified compounds were already present. Subsequently, the mixture was subjected to direct esterification at atmospheric pressure for 3 hours and 20 minutes at a temperature of 240° C. to give esterified compounds. Thereafter, the resultant esterified compounds were fed into a polycondensation reactor equipped with an agitator and a torque meter. The temperature and degree of vacuum were slowly increased to final temperature and pressure of 285° C. and 0.5 torr, respectively, in carrying out polycondensation. The polycondensation reaction was terminated after 1 hour and 25 minutes. The polycondensation polymers were extruded from the lower nozzle of the reactor into cooling water to form polymers the intrinsic viscosity of which was 0.650. The L value and the b value of the final product were measured to be 61.2 and 2.1, respectively.

Comparative Example 2

An esterificaiton was carried out in a manner similar to that in Example 9, except that the reaction catalysts were not added into the EG/TPA mixture and previously esterified compounds. The esterification was continued for 3 hours and 50 minutes. Then, the esterified compounds were polycondensed by adding 300 ppm of antimony trioxide and 100 ppm of trimethylphosphate to the amount of the resulting PET products under the same polycondensation conditions as described in Example 9. In order for the final product to obtain the same intrinsic viscosity, 1 hour and 50 minutes were taken in polycondensation. The L value and the b value of the final product were measured to be 59.1 and 2.3, respectively.

EXAMPLE 10

A catalyst solution was prepared by reaction 100 ppm of tetraisopropyl di(dioctyl) phosphitotitanate and 50 ppm of cobalt acetate in relation to the amount of the resulting PET products in methanol at the temperature of 50° C. for 24 hours. The catalyst solution was fed into an esterification reactor which contained 300 parts of EG and 580 parts of DMT. Subsequently, the mixture was subjected to direct esterification at a high pressure for 3 hours and 30 minutes at a temperature of 210° C. to yield esterified compounds. Thereafter, the resulting esterified compounds were fed into a polycondensation reactor equipped with an agitator and a torquemeter. The temperature and degree of vacuum were slowly increased to a final temperature and pressure of 285° C. and 0.5 torr, respectively, in carrying out polycondensation. The polycondensation reaction was terminated after 1 hour and 40 minutes. The polycondensation polymers were extruded from the lower nozzle of the reactor into cooling water to form polymers the intrinsic viscosity of which was 0.652. The L value and the b value of the final product were measured to be 63.5 and 2.5, respectively.

EXAMPLE 11

A catalyst solution was prepared by reacting 200 ppm of tetrabutyl titanate and 50 ppm of cobalt acetate in relation to the amount of the resulting PBT products in methanol at a temperature of 50° C. for 24 hours. The catalyst solution was fed into an transesterification reactor in which 450 parts of BD(1,4-Butanediol) and 580 parts of DMT were already present. The reactor temperature was gradually raised to a final temperature of 230° C. and the transesterification was continued for 3 hours and 10 minutes at that condition. The resulting esterified compounds were fed into a polycondensation reactor equipped with an agitator and a torque meter and 500 ppm of Irganox 1010 in relation to the resulting PBT products was added. The temperature and degree of vacuum were slowly increased to a final temperature and pressure of 245° C. and 0.5 torr, respectively, in carrying out polycondensation. The polycondensation reaction was terminated after 1 hour and 50 minutes. The polycondensation polymers were extruded from the lower nozzle of the reactor into cooling water. The intrinsic viscosity of the final product was 0.96 and the b value was measured to be 1.9.

EXAMPLE 12

A catalyst solution was prepared by reacting 100 ppm of tetrabutyltitanate and 50 ppm of cobalt acetate in relation to the amount of the resulting copolymers in methanol at a temperature of 60° C. for 12 hours. The catalyst solution was fed into a slurry of 102 parts of EG, 200 parts of 2,6-NDCA, 20 parts of TPA and 80 parts of methanol at atmospheric pressure and room temperature and esterification and polycondensation were carried out under the same conditions as described in Example 1. In order for the final product to obtain the same esterification ratio and intrinsic viscosity, 3 hours and 30 minutes and 1 hour and 25 minutes were taken in esterification and polycondensation respectively. The L value and the b value of the final product were measured to be 66.3 and 3.4, respectively.

EXAMPLE 13

A catalyst solution was prepared by reacting 100 ppm of tetraisopropyltitanate, 50 ppm of cobalt acetate and 50 ppm of manganese acetate in relation to the amount of the resulting copolymers in methanol at the temperature of 60° C. for 12 hours. The catalyst solution was fed into a slurry of 260 parts of EG, 400 parts of 2,6-NDC and 36 parts of DMT, and an esterification and polycondensation were carried out under the same conditions as described in Example 8. In order for the final product to obtain the same esterification ratio and intrinsic viscosity, 3 hours and 10 minutes and 1 hour and 20 minutes were taken in esterification and polycondensation respectively. The L value and the b value of the final product were measured to be 65.3 and 3.1, respectively.

As so far described, according to the process for preparing a polyester-based polymer of the present invention, a high quality polyester-based polymer of good color and excellent physical properties can be fabricated. In addition, the esterification and polycondensation reaction time can be considerably shortened, having an effect that its productivity can be enhanced. Thus, its industrial applicability is expectedly high.

As the present Invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A process for preparing polyester polymers comprising the steps of:
   (a) esterifying either a naphthalene dicarboxylic acid, a dicarboxylic acid containing naphthalene dicarboxylic acid, a terephthalic acid or ester derivatives thereof, with at least one glycol selected from the group consisting of ethylene glycol, propanediol, butanediol, pentanediol, hexanediol and derivatives thereof to produce esterified compounds or its low molecular weight polymers; and
   (b) polycondensing continuously the resultant esterified product of step (a) to produce polyester polymers;
   wherein in the above preparing process a composite polymerization catalyst is used which is prepared by reacting at least one compound of cobalt and at least one compound of titanium selected from the group consisting of a titanate compound, a phosphite complex compound thereof and mixtures thereof, in the presence of a solution comprising at least one alcohol compound selected from the group consisting of methanol, ethanol, propanol, isopropanol, butanol, and mixtures thereof, the titanate compound being represented by the following general formula I:

$(RO)_4Ti$             Formula I wherein each R is independently the same or different and is selected from the group consisting of methyl, ethyl, n-propyl, isopropyl, n-butyl, isobutyl, sec-butyl, tert-butyl, n-amyl, acetylisopropyl, pentyl, hexyl, heptyl, 2-ethylhexyl, n-amyl, acetylisopropyl, pentyl, hexyl, heptyl, 2-ethylhexyl, octyl, decyl, dodecyl, tridecyl, octadecyl, stearyl, allyl, 2,2-diallyloxymethylbutyl, cyclopentyl, cyclohexyl, naphthyl, phenyl, benzyl, and dodecylbenzyl.

2. The process for preparing polyester polymers according to claim 1, wherein said titanium compound is a titanium phosphite complex compound represented by the following general formula II:

$(RO)_4Ti.2XP(O)(OR')_2$          Formula II wherein each of R and R' is independently the same or different and is selected from the group consisting of methyl, ethyl, n-propyl, isopropyl, n-butyl, isobutyl, sec-butyl, tert-butyl, n-amyl, acetylisopropyl, pentyl, hexyl, heptyl, 2-ethylhexyl, octyl, decyl, dodecyl, tridecyl, octadecyl, stearyl, allyl, 2,2-diallyloxymethylbutyl, cyclopentyl, cyclohexyl, naphthyl, phenyl, benzyl, and dodecylbenzyl; and wherein X represents hydrogen, halogen, alkyl, alkoxy or aryloxy.

3. The process for preparing polyester polymers according to claim 1, wherein said dicarboxylic acid containing naphthalene dicarboxylic acid is a mixture of 2,6-NDCA, with TPA.

4. The process for preparing polyester polymers according to claim 1, wherein said titanium compound is selected from the group consisting of tetraisopropyl titanate, tetrabutyl titanate and tetraisopropyldi(dioctyl)phosphito titanate.

5. The process for preparing polyester polymers according to claim 1, wherein said cobalt compound is one or more selected from the group consisting of cobalt acetate, cobalt ethylhexyl octoate, cobalt nitrate and cobalt oxalate.

6. The process for preparing polyester polymers according to claim 5, wherein said cobalt compound is cobalt acetate or cobalt nitrate.

7. The process for preparing polyester polymers according to claim 1, wherein the solution comprising at least one alcohol compound further comprises ethylene glycol.

8. The process for preparing polyester polymers according to claim 1, wherein water is added to the alcohol compound.

9. The process for preparing polyester polymers according to claim 8, wherein the amount of said water is 0.01 to 10.0 times by weight with respect to the amount of said alcohol compound.

10. The process for preparing polyester-based polymers according to claim 1, wherein the amount of said composite polymerization catalyst is 50 to 2,000 ppm to the resulting polyester polymers.

11. The process for preparing polyester polymers according to claim 1, wherein said alcohol solution in which the composite polymerization catalyst is dissolved is heated to a temperature of 30 to 200° C.

12. The process for preparing polyester polymers according to claim 1, wherein the composite polymerization catalyst further comprises at least one selected from the group consisting of an antimony compound, a tin compound, a germanium compound, a zinc compound and a manganese compound.

13. The process for preparing polyester polymers according to claim 12, wherein the composite polymerization catalyst further comprises at least one selected from the group consisting of antimony trioxide, antimony triacetate, dibutyltin maleate, germanium oxide, zinc acetate and manganese acetate.

14. The process for preparing polyester polymers according to claim 1, wherein the composite polymerization catalyst is prepared in a powder form.

* * * * *

UNITED STATES PATENT AND TRADEMARK OFFICE
CERTIFICATE OF CORRECTION

PATENT NO.      : 6,663,961 B2
DATED           : December 16, 2003
INVENTOR(S)     : Hyun-Nam Cho et al.

It is certified that error appears in the above-identified patent and that said Letters Patent is hereby corrected as shown below:

<u>Title page,</u>
Item [73], Assignees, delete "Oil Corporation" and substitute -- S-Oil Corporation --.

Signed and Sealed this

First Day of June, 2004

JON W. DUDAS
*Acting Director of the United States Patent and Trademark Office*